Jan. 24, 1956  T. BRENDEL  2,731,884
TRIPLET-TYPE PHOTOGRAPHIC OBJECTIVE LENS
Filed April 15, 1954
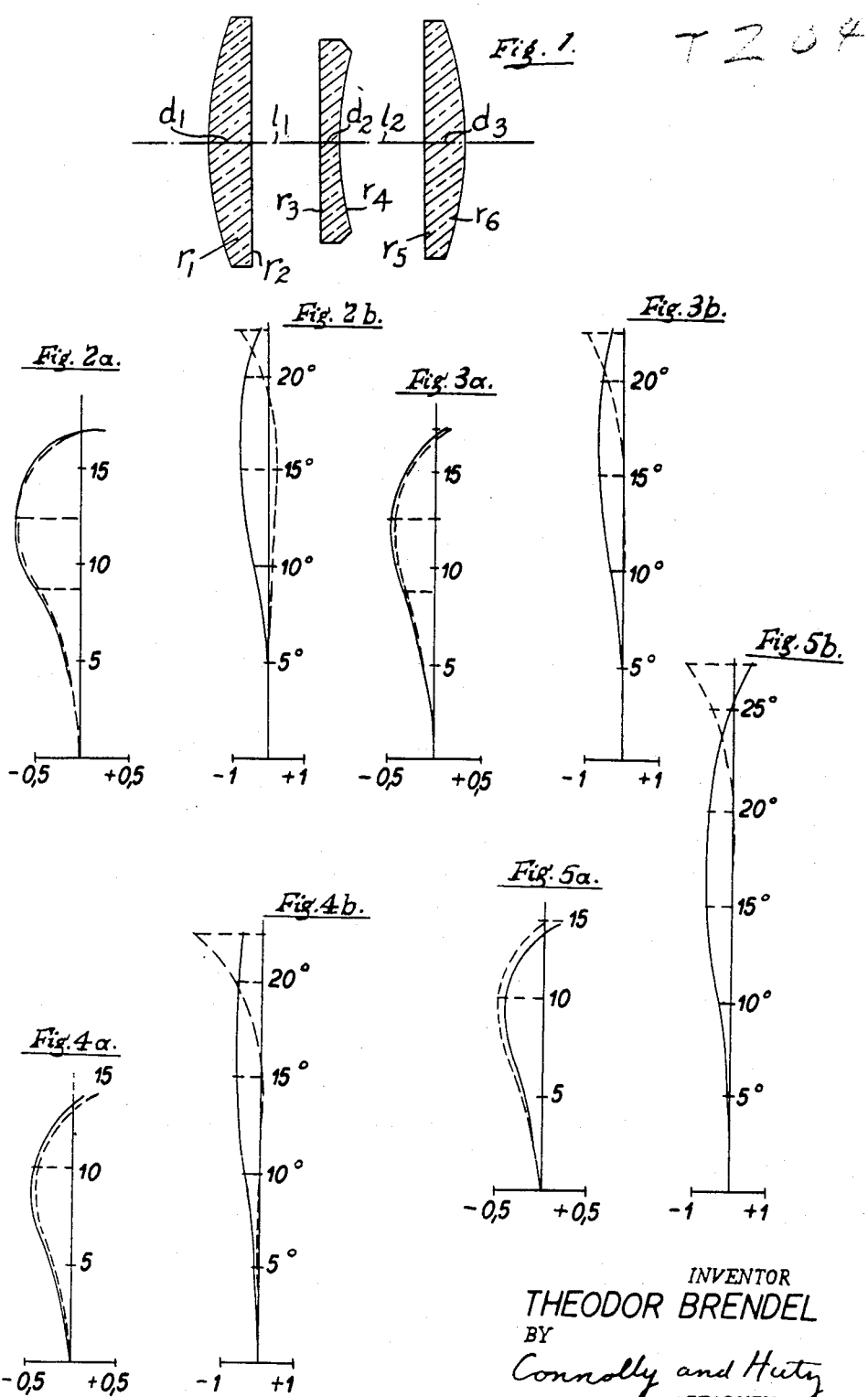
INVENTOR
THEODOR BRENDEL
BY
Connolly and Hutz
ATTORNEY

United States Patent Office 2,731,884
Patented Jan. 24, 1956

2,731,884
TRIPLET-TYPE PHOTOGRAPHIC OBJECTIVE LENS

Theodor Brendel, Munich, Germany, assignor to Agfa Camera-Werk Aktiengesellschaft, Munich, Germany, a corporation of Germany Application April 15, 1954, Serial No. 423,373

Claims priority, application Germany April 28, 1953

5 Claims. (Cl. 88—57)

This invention relates to a triplet-type photographic objective with a minimum aperture ratio of 1:4.0, in the case of which the overall length, that is to say the sum of all axial thicknesses and separating distances $[\Sigma(d+l)]$ is at least 0.25 times and at most 0.45 times the focal length (f) of the objective and at the same time the sum of the axial separating distances $(\Sigma l)$ lies between 1.4 and 1.8 times the sum of the axial thicknesses $(\Sigma d)$, and of which the biconcave negative lens between the two positive lenses is such that its surface of lesser curvature $(r_3)$ faces the front lens from the point of view of the photographic exposure.

In the case of known objectives of this type, the aberration correction is effected essentially to such a degree that with the customary aperture ratio of 1:3.5 an image field of about 45° is rendered sufficiently sharp without excessive loss of brightness in the corners. It has been found, however, that with these known objectives an increase of the aperture ratio to about 1:2.8 with the same image field (45°), on account of the rapid increase of spherical aberration, leads to a generally unsatisfactory result. Similarly, with an aperture ratio of 1:3.5, satisfactory distinctness and illumination of an image field, which is widened beyond the given figure of 45° cannot be attained owing to a rapid deterioration of the astigmatic correction and to a considerable reduction of the brightness.

It has been established that the performance of objectives, such as described above, can be improved with good correction and sufficient brightness in the corners of the image, when either an image field of approximately 45°, customary with miniature cameras is used with an aperture ratio of 1:2.8, or an image field of approximately 55°, such as is used for 6 x 6 and 6 x 9 cameras with an aperture ratio of 1:3.5.

This improved performance is achieved according to the present invention, by, on the one hand, making the arithmetic mean of the refraction indices (with reference to the $d$ line of the spectrum, evaluated at 587.6 m$\mu$) of the two converging lenses (expressed as $\frac{n_1+n_3}{2}$)

greater than 1.7, and making the refraction index of the dispersing lens $(n_2)$ smaller than 1.7; and, on the other hand, making the ratio of the radius of the front surface $(r_1)$ from the point of view of photographic exposure and of the radius $(r_4)$ of the surface of the greater curvature of the negative lens between 1.05 to 1.25. Furthermore, the radius $(r_3)$ of the surface of lesser curvature of the negative lens amounts to at least 0.5 and at most 0.8 times the focal length of the objective.

In order to obtain a good chromatic correction for the objective embodied in the present invention the Abbé number of the glass of the front lens $(\nu_1)$ is greater than that of the rear lens $(\nu_3)$.

By using the above described method it is possible to reduce the surface shares of the individual image aberrations to such an extent that in the case of an objective having an aperture ratio of 1:2.8, and where there is an adequate astigmatic correction, a considerable decrease of the spherical aberration is obtained. Furthermore, for an objective of the aperture ratio 1:3.5 a considerably enlarged image field is provided without detriment of the spherical correction.

The novel features of the present invention will become apparent to one skilled in the art from a reading of the following description in conjunction with the accompanying drawings in which:

Fig. 1 is a cross section through an objective which is an embodiment of the present invention;

Fig. 2a is a correction curve for spherical aberration of an objective with an aperture ratio of 1:2.8, which is an example of the prior art;

Fig. 2b is the correction curve for astigmatic aberration of the same objective referred to in Fig. 2a;

Fig. 3a is the correction curve for spherical aberration of an objective having an aperture ratio of 1:2.8 of the type shown in Fig. 1;

Fig. 3b is the correction curve for astigmatic aberration of the same objective referred to in Fig. 3a;

Fig. 4a is the correction curve for spherical aberration of an objective having an aperture ratio of 1:3.5 which is an example of the prior art;

Fig. 4b is the correction curve for astigmatic aberration of the same objective referred to in Fig. 4a;

Fig. 5a is the correction curve for spherical aberration of an objective having an aperture ratio of 1:3.5 of the type shown in Fig. 1; and Fig. 5b is the correction curve for astigmatic aberration of the same objective referred to in Fig. 5a.

Optical data for objectives of the type shown in Fig. 1 are given in the following tables. Tables 1 and 2 include the optical data for an objective having an aperture ratio of 1:2.8 of the type shown in Fig. 1. Table 3 includes the optical data for an objective having an aperture ratio of 1:3.5 of the type shown in Fig. 1. In these tables $r_1, r_2 \ldots r_6$ refer to the radii of curvature of the individual lens surfaces counting from the long conjugate side or front of the objective; $d_1$, $d_2$, and $d_3$ refer to the axial thicknesses of the individual elements; $l_1$ and $l_2$ refer to the axial air separations between the components; $n_1$, $n_2$, and $n_3$ refer to the refractive indices (relative to the $d$-line of the spectrum evaluated as 587.6 m$\mu$) of the glass of each element; and $\nu_1$, $\nu_2$, and $\nu_3$ refer to the Abbé number of the glass of each element; and the focal lentgh (f)=1.00.

Table 1

[Aperture ratio 1:2.8     Image field 45°]

| | | | |
|---|---|---|---|
| $r_1=+0.43818$ | $d_1=0.06250$ | $n_1=1.69086$ | $\nu_1=54.7$ |
| $r_2=\infty$ | $l_1=0.11786$ | | |
| $r_3=-0.54300$ | $d_2=0.01659$ | $n_2=1.68734$ | $\nu_2=31.3$ |
| $r_4=+.44599$ | $l_2=0.10417$ | | |
| $r_5=+3.08335$ | $d_3=0.06057$ | $n_3=1.71683$ | $\nu_3=47.9$ |
| $r_6=-0.43480$ | | | |

Table 2

[Aperture ratio 1:2.8    Image field 45°]

| | | | |
|---|---|---|---|
| $r_1 = + 0.44435$ | $d_1 = 0.06221$ | $n_1 = 1.71300$ | $\nu_1 = 53.9$ |
| $r_2 = +15.49477$ | $l_1 = 0.11902$ | | |
| $r_3 = - 0.56553$ | $d_2 = 0.01691$ | $n_2 = 1.69895$ | $\nu_2 = 30.1$ |
| $r_4 = + 0.45444$ | $l_2 = 0.10520$ | | |
| $r_5 = + 3.23175$ | $d_3 = 0.06213$ | $n_3 = 1.74400$ | $\nu_3 = 44.7$ |
| $r_6 = - 0.45346$ | | | |

Table 3

[Aperture ratio 1:3.5    Image field 55°]

| | | | |
|---|---|---|---|
| $r_1 = + 0.32065$ | $d_1 = 0.05167$ | $n_1 = 1.69086$ | $\nu_1 = 54.7$ |
| $r_2 = \infty$ | $l_1 = 0.06221$ | | |
| $r_3 = - 0.74645$ | $d_2 = 0.01033$ | $n_2 = 1.64649$ | $\nu_2 = 34.0$ |
| $r_4 = + 0.32065$ | $l_2 = 0.11905$ | | |
| $r_5 = +10.33087$ | $d_3 = 0.05167$ | $n_3 = 1.71683$ | $\nu_3 = 47.9$ |
| $r_6 = - 0.53846$ | | | |

Figs. 2a, 2b, 3a, 3b, 4a, 4b, 5a and 5b illustrate in the customary Rohr's representation the degree of correction with respect to spherical aberration and astigmatism of objetcives in accordance with this present invention in comparison with ordinary objectives. In the correction curves shown in Figs. 2a, 3a, 4a, and 5a, the curves drawn in full line represent spherical aberration, and the curves drawn in broken line represent the sine-condition aberration. In the correction curve shown in Figs. 2b, 3b, 4b, and 5b, the curves drawn in full line represent sagittal astigmatic aberration, and the curves drawn in broken line represent the meridional astigmatic aberration. The aberrations in these figures are stated in percentages of the equivalent focal length, which is equal to 100.

Figs. 2a and 2b show the correction curves for an ordinary objective having an aperture ratio of 1:2.8. Figs. 3a and 3b show the correction curves for an objective also having an aperture ratio of 1:2.8 and constructed in accordance with this present invention. A comparison of Figs. 2a and 2b with Figs. 3a and 3b clearly indicates the superiority of performance to an unexpected degree of the objective in accordance with this invention.

Figs. 4a and 4b show the correction curves for an ordinary objective having an aperture ratio of 1:3.5. Figs. 5a and 5b show the correction curves for an objective also having an aperture ratio of 1:3.5 and constructed in accordance with this present invention. A comparison of Figs. 4a and 4b with Figs. 5a and 5b clearly indicates the superiority of performance to an unexpected degree of the objective in accordance with this invention.

Obviously many modifications and variations of the present invention are possible in the light of the above teachings. It is, therefore to be understood that within the scope of the appended claims the invention may be practiced otherwise than as specifically described.

What I claim is:

1. A triple-type photographic objective having a minimum aperture ratio of 1:40 comprising a biconcave negative lens between two positive lenses, the sum $[\Sigma(d+l)]$ of the thicknesses $(d)$ and the axial separating distances $(l)$ of said lenses being between 0.25 times and 0.45 times the focal length (f) of the objective, the sum $(\Sigma l)$ of said lenses being between 1.40 times and 1.80 times the sum $(\Sigma d)$ of said axial thicknesses of said lenses, and the constructional factors of said objective fulfilling all the following conditions:

(a)
$$n_2 < 1.70 < \frac{n_1 + n_3}{2}$$

(b)
$$1.05 < \frac{r_1}{\Sigma(d+l)} < 1.25$$

and $$1.05 < \frac{r_4}{\Sigma(d+l)} < 1.25$$

(c) $r_3$ amounts to at least 0.5 times and at most 0.8 times the focal length (f) of the objective where $n_1, n_2, \ldots$ represent the indices of refraction, $r_1, r_3$ and $r_4$ represent the radii of curvature, and subscripts are counted from the front of said objective.

2. An objective as set forth in claim 1, wherein the front positive lens is formed of glass having an Abbé number greater than the Abbé number of the glass of the rear positive lens.

3. A triplet-type photographic objective having a minimum aperture ratio of 1:40 comprising a biconcave negative lens between two positive lenses, the sum $[\Sigma(d+l)]$ of the thicknesses $(d)$ and the axial separating distances $(l)$ of said lenses being between 0.25 times and 0.45 times the focal length (f) of the objective, the sum $(\Sigma l)$ of said lenses being between 1.40 times and 1.70 times the sum $(\Sigma d)$ of said axial thicknesses of said lenses, the constructional factors of said objective having numerical data substantially as follows:

[f=1.0    Aperture ratio 1:2.8    Image field 45°]

| | | | |
|---|---|---|---|
| $r_1 = +0.43818$ | $d_1 = 0.06250$ | $n_1 = 1.69086$ | $\nu_1 = 54.7$ |
| $r_2 = \infty$ | $l_1 = 0.11786$ | | |
| $r_3 = -0.54300$ | $d_2 = 0.01659$ | $n_2 = 1.68734$ | $\nu_2 = 31.3$ |
| $r_4 = +0.44599$ | $l_2 = 0.10417$ | | |
| $r_5 = +3.08335$ | $d_3 = 0.06057$ | $n_3 = 1.71683$ | $\nu_3 = 47.9$ |
| $r_6 = -0.43480$ | | | | in which $r_1, r_2, \ldots$ represent the radii of curvature; $d_1, d_2, \ldots$ represent the axial thicknesses of the lenses; $l_1, l_2, \ldots$ represent the axial separating distances; $n_1, n_2, \ldots$ represent the refractive indices; $\mu_1, \mu_2, \ldots$ represent the Abbé numbers; wherein the subscripts are counted from the front of said objective; and the (f) focal length=1.00.

4. A triplet-type photographic objective having a minimum aperture ratio of 1:40 comprising a biconcave negative lens between two positive lenses, the sum $[\Sigma(d+l)]$ of the thicknesses $(d)$ and the axial separating distances $(l)$ of said lenses being between 0.25 times and 0.45 times the focal length (f) of the objective, the sum $(\Sigma l)$ of said lenses being between 1.40 times and 1.70 times the sum $(\Sigma d)$ of said axial thicknesses of said lenses, the constructional factors of said objective having numerical data substantially as follows:

[f=1.0    Aperture ratio 1:2.8    Image field 45°]

| | | | |
|---|---|---|---|
| $r_1 = + 0.44435$ | $d_1 = 0.06221$ | $n_1 = 1.71300$ | $\nu_1 = 53.9$ |
| $r_2 = +15.49477$ | $l_1 = 0.11902$ | | |
| $r_3 = - 0.56553$ | $d_2 = 0.01691$ | $n_2 = 1.69895$ | $\nu_2 = 30.1$ |
| $r_4 = + 0.45444$ | $l_2 = 0.10520$ | | |
| $r_5 = + 3.23175$ | $d_3 = 0.06213$ | $n_3 = 1.74400$ | $\nu_3 = 44.7$ |
| $r_6 = - 0.45346$ | | | | in which $r_1, r_2, \ldots$ represent the radii of curvature; $d_1, d_2, \ldots$ represent the axial thicknesses of the lenses; $l_1, l_2, \ldots$ represent the axial separating distances; $n_1, n_2, \ldots$ represent the refractive indices; $\mu_1, \mu_2, \ldots$ represent the Abbé numbers; wherein the subscripts are counted from the front of said objective; and the (f) focal length=1.00.

5. A triplet-type photographic objective having a minimum aperture ratio of 1:40 comprising a biconcave negative lens between two positive lenses, the sum $[\Sigma(d+l)]$ of the thicknesses $(d)$ and the axial separating distances $(l)$ of said lenses being between 0.25 times and 0.45 times the focal length (f) of the objective, the sum $(\Sigma l)$ of said lenses being between 1.40 times and 1.70 times the sum ($\Sigma d$) of said axial thicknesses of said lenses, the constructional factors of said objective having numerical data substantially as follows:

[$f = 1.0$  Aperture ratio 1:3.5  Image field 55°]

| | | | |
|---|---|---|---|
| $r_1 = + 0.32065$ | $d_1 = 0.05167$ | $n_1 = 1.69086$ | $\nu_1 = 54.7$ |
| $r_2 = \infty$ | | | |
| | $l_1 = 0.06221$ | | |
| $r_3 = - 0.74645$ | | | |
| | $d_2 = 0.01033$ | $n_2 = 1.64649$ | $\nu_2 = 34.0$ |
| $r_4 = + 0.32065$ | | | |
| | $l_2 = 0.11905$ | | |
| $r_5 = + 10.33087$ | | | |
| | $d_3 = 0.05167$ | $n_3 = 1.71683$ | $\nu_3 = 47.9$ |
| $r_6 = - 0.53846$ | | | | in which $r_1, r_2, \ldots$ represent the radii of curvature; $d_1, d_2, \ldots$ represent the axial thicknesses of the lenses; $l_1, l_2, \ldots$ represent the axial separating distances; $n_1, n_2, \ldots$ represent the refractive indices; $\nu_1, \nu_2, \ldots$ represent the Abbé numbers; wherein the subscripts are counted from the front of said objective; and the (f) focal length = 1.00.

References Cited in the file of this patent

UNITED STATES PATENTS

| | | |
|---|---|---|
| 1,035,408 | Beck | Aug. 13, 1912 |
| 1,658,365 | Altman | Feb. 7, 1928 |
| 1,892,162 | Richter | Dec. 27, 1932 |
| 1,987,878 | Tronnier | Jan. 15, 1935 |
| 2,388,869 | Reiss | Nov. 13, 1945 |
| 2,487,873 | Herzberger et al. | Nov. 15, 1949 |
| 2,645,157 | Lowenthal | July 14, 1953 |